Figure 1:
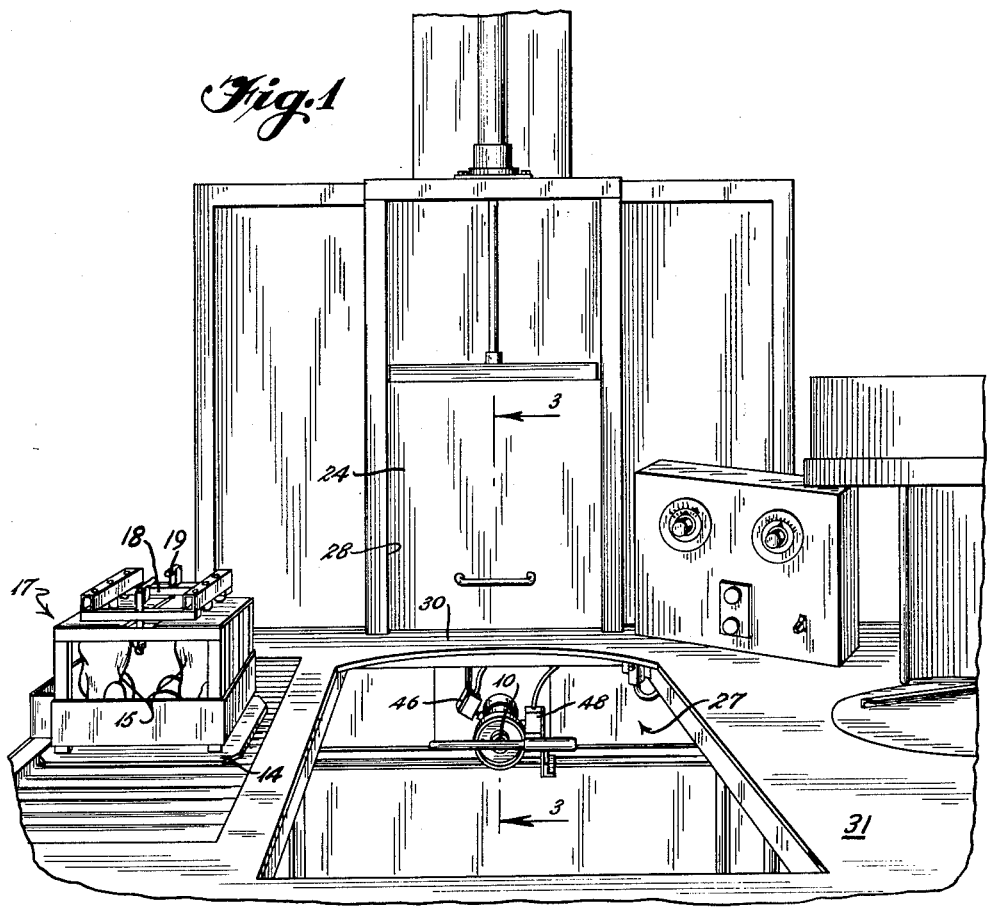

Dec. 15, 1964    D. C. HUNGERFORD ETAL    3,161,712
ROTATIONAL MOLDING
Filed June 12, 1961    4 Sheets-Sheet 1

INVENTORS
D. C. HUNGERFORD
W. A. STANKIEWITCH

BY
ATTORNEYS

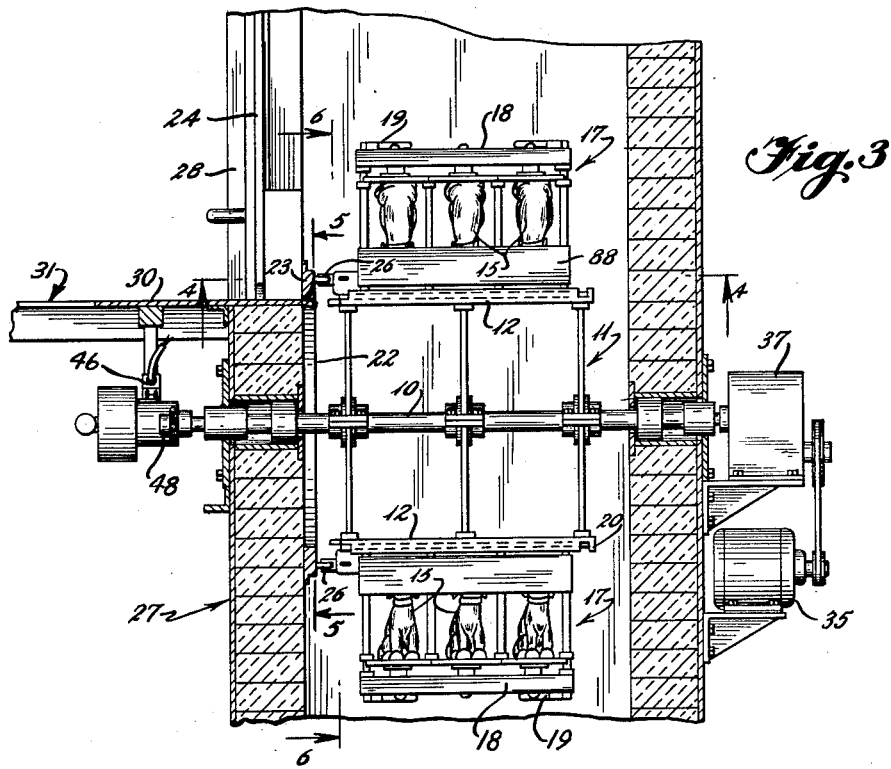
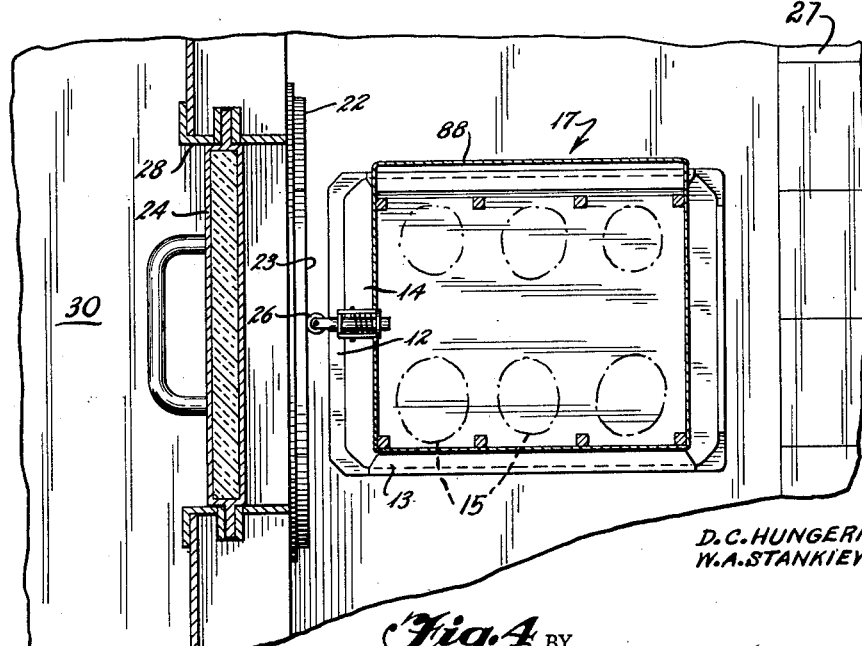

Dec. 15, 1964    D. C. HUNGERFORD ETAL    3,161,712
ROTATIONAL MOLDING

Filed June 12, 1961    4 Sheets-Sheet 3

INVENTORS
D. C. HUNGERFORD
W. A. STANKIEWITCH

BY
ATTORNEYS

Dec. 15, 1964    D. C. HUNGERFORD ETAL    3,161,712
ROTATIONAL MOLDING
Filed June 12, 1961    4 Sheets-Sheet 4
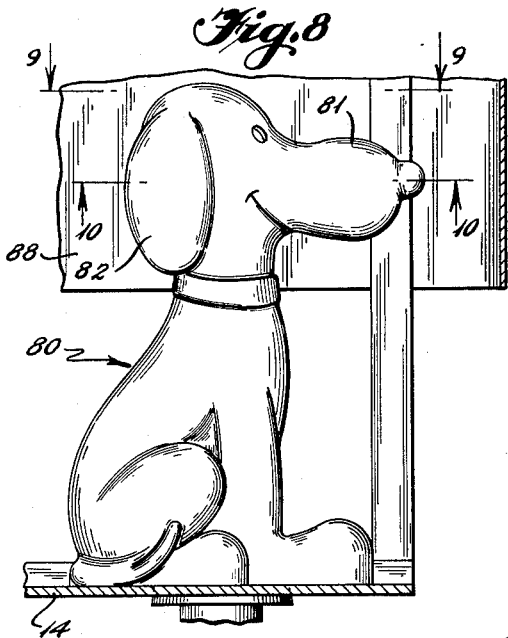
Fig. 8
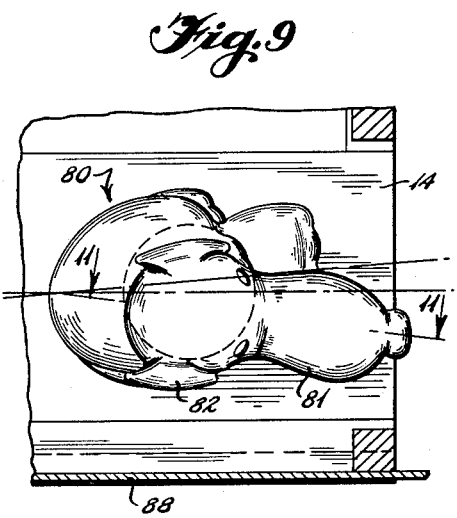
Fig. 9
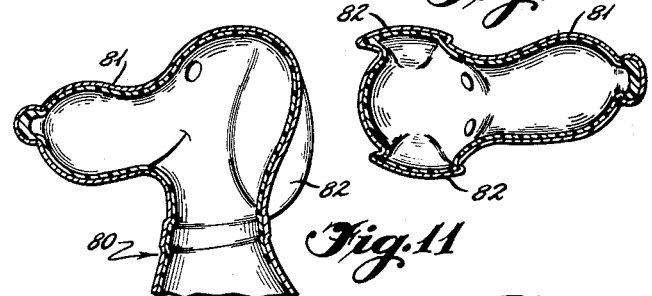
Fig. 10
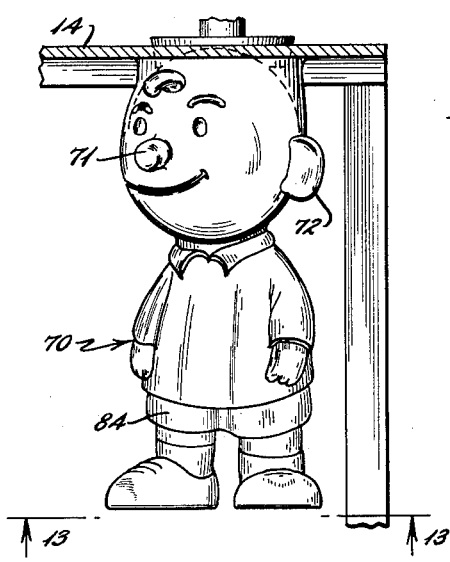
Fig. 12
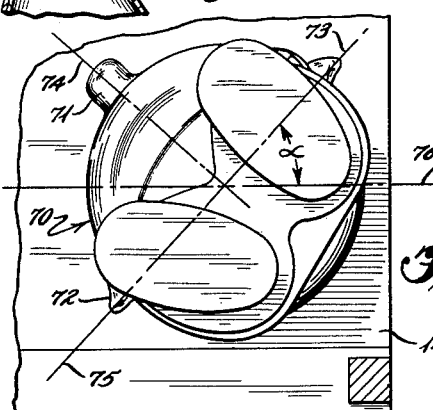
Fig. 11
Fig. 13
INVENTORS
D. C. HUNGERFORD and
W. A. STANKIEWITCH
BY
ATTORNEYS United States Patent Office 3,161,712
Patented Dec. 15, 1964

3,161,712
ROTATIONAL MOLDING
Dan C. Hungerford, Morristown, and William A. Stankiewitch, Dover, N.J., assignors, by mesne assignments, to Air Reduction Company, Incorporated, a corporation of New York
Filed June 12, 1961, Ser. No. 116,482
6 Claims. (Cl. 264—310)

This invention relates to molding and more particularly to the casting of hollow objects from various materials, particularly synthetic resins of the type known as vinyl plastisol. Such objects are commonly of doll size and represent various characters which have become well known through television, comic strips and other media. Other objects may include doll heads, rockets and balls, and industrial products such as atomizer bulbs, automobile arm rests, and crash pads.

Heretofore, such objects have been formed generally by techniques known as slush molding and rotational casting or molding. Slush molding is described in Plastics Engineering Handbook, 3rd edition, copyright 1960, by the Society of the Plastic Industry, Inc., pages 270–272, as consisting of "producing the desired thickness of coating on the inside wall of a mold, fusing, and then removing the finished article from the mold without distortion or tearing." According to the description, in slush molding the mold is filled to the top with vinyl plastisol and exposed to gelling temperature in an oven for a period of time, after which the material remaining in liquid form is dumped out, following which the semi-fused material is again exposed in an oven where it is completely fused. Variations of this method are employed.

Another technique for making such objects is known as rotational casting, which is described in the Handbook at page 275 as follows: "A hollow thin-walled sectional mold is charged with a predetermined amount of plastisol and then closed. The closed mold is rotated in two or more planes, and at the same time heated to gel or fuse the film of plastisol which has been evenly distributed on the interior wall of the mold. In most cases, heating is continued until fusion of the plastisol is attained, usually at about 350° F. After adequate fusion the mold is cooled and opened and the molded article is removed."

It has been recognized that the slush molding process has drawbacks, and such process has been replaced in part by the rotational molding technique described. However, the rotational molding technique, requiring, as described, rotation in two or more planes, suffers from serious drawbacks. Among these is the requirement for so mounting the mold that rotation is produced in two or more planes. This presents additional complexity and expense. Further, in batch apparatus, is the necessity for mounting the molds so that they cannot be dropped in the furnace during movement. Although apparatus has been provided for such purpose, there is the possibility of its becoming worn or not being entirely closed. The dropping of a mold in the furnace produces a serious shutdown problem and many hours may be required to clean out the mold for further use. An accompanying disadvantage has been the higher first cost of the apparatus required to mold in two or more planes.

A further disadvantage has been that such molding has resulted in thin or weak spots where strength is required, thereby necessitating the use of harder or stiffer plastics to compensate, instead of using the softer plastics usually preferred by the users of dolls or other objects.

Accordingly, it is an object of the present invention to provide an improved and simplified method and apparatus for molding hollow objects from a material such as vinyl plastisol and to overcome the disadvantages to which reference has been made.

Figure 2:
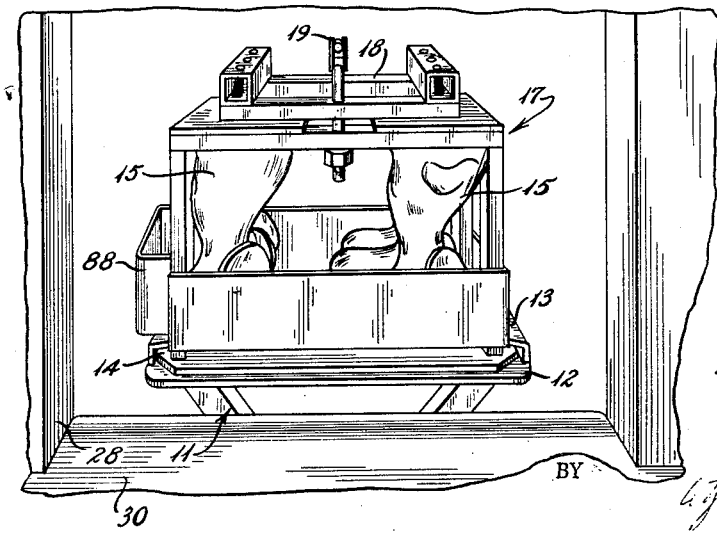
Figure 5:
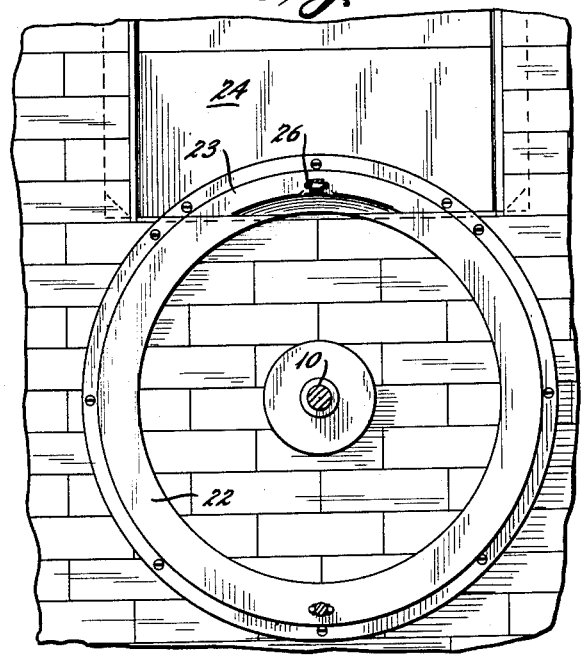
Figure 6:
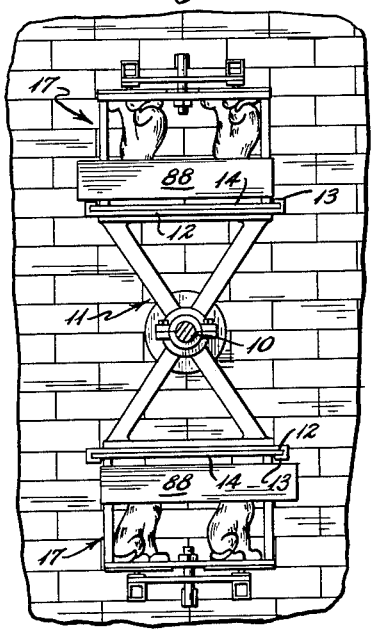
Figure 7:
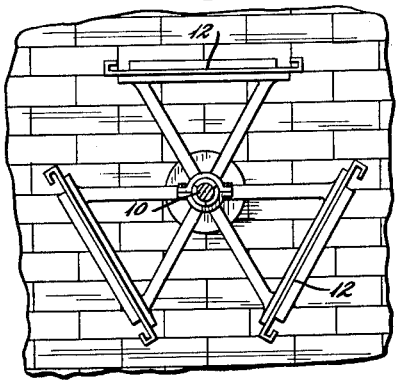

These and other objects of the invention will become apparent from the following description in conjunction with the accompanying drawings, in which:

FIG. 1 is a perspective of molding apparatus of a type useful for carrying out the present invention;

FIG. 2, an enlarged perspective of a mold mounted on the support plate in the furnace and with the door of the latter open;

FIG. 3, a section, to an enlarged scale, on the line 3—3 of FIG. 1, illustrating the support and drive means for the mold within the furnace;

FIG. 4, a section, to an enlarged scale, on the line 4—4 of FIG. 3;

FIG. 5, a section, to an enlarged scale, on the line 5—5 of FIG. 3;

FIG. 6, a section on the line 6—6 of FIG. 3;

FIG. 7, a view similar to that of FIG. 6, illustrating a modified form of mold supporting apparatus;

FIG. 8, an elevation, partly in section, of a mold for a toy dog;

FIG. 9, a section on the line 9—9 of FIG. 8;

FIG. 10, a section on the line 10—10 of FIG. 8;

FIG. 11, a section on the line 11—11 of FIG. 9;

FIG. 12, an elevation, partly in section, of a mold for another cartoon character or caricature;

FIG. 13, a section on the line 13—13 of FIG. 12; and

Figure 14:
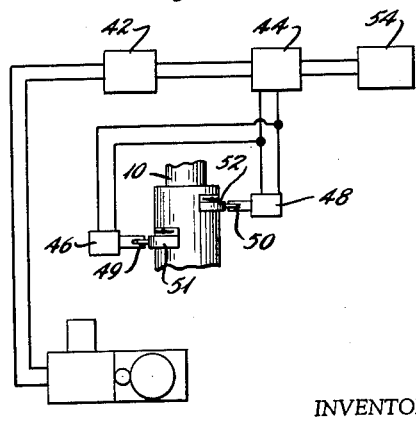

FIG. 14, a schematic block diagram of the control circuit for the molding apparatus.

Briefly stated, the present invention provides for the mounting of the mold for rotation about a horizontal axis and with the main longitudinal axis of the mold cavity positioned substantially parallel to a radial line disposed in a plane disposed at right angles to the horizontal axis and with the main transverse axis of the mold cavity positioned in a plane which is at right angles to the axis of rotation, except where any substantial lateral formation normal thereto exists, in which case the mold is positioned with its main transverse axis at an angle to such plane, and in which the mold is rotated intermittently in the same and reverse directions within the furnace where it is exposed to appropriate heat treatment.

With further reference to the drawings, there is illustrated a rotatably mounted shaft 10 having a frame 11 by means of which plates 12 are supported at spaced distances from the axis. The plates have L-shaped flanges 13 spaced to receive the base 14 of a mold plate from which a plurality of molds 15 are upstanding. The molds 15 are mounted in a frame 17 having a top closure member 18 with locking means 19. The mold plate and its locking means may be constructed like that disclosed in the Gabler Patent 2,926,388. At the back of the plate 12 a stop 20 is positioned to engage the back of the mold plate base 14. Various means may be employed for locking the front end of the mold plate base. A preferred structure may include a partial ring or guard member 22 having an upper segment 23 mounted on the door 24 and positioned to engage a bearing 26 on the front of each mold plate base. The gap in the ring 22 is sufficient to permit withdrawal of the mold plate when the door is raised.

The mold structure is designed to facilitate handling and to accommodate a plurality of molds. In a preferred embodiment the mold plate bases are 19 by 14 inches and are mounted on support plates 12 spaced approximately 8 inches from the axis of the shaft 10. The shaft rotates the apparatus within an oven or furnace 27 having an opening 28 with a slidable door 24. The opening has a shelf 30 extending from the work surface which is outside of the oven. In its horizontal upright position the plate 12 is at the same level as the work surface 31 in order that the base 14 of the mold plate may be slid onto and off of the plate 12. Auxiliary apparatus for cooling, moving and filling the molds may be positioned on or adjacent to the work surface 31.

The shaft is driven by suitable means such as an electric motor 35 operating through gear box 37. The motor may be of a well known variable speed type having suitable controls including a stop-start and reversing switch 42. Associated with the reversing switch is a counting or timing mechanism 44 to which microswitches 46 and 48 are connected. The microswitches are actuated by rollers 49–50 which are urged toward and ride the shaft 10 as it rotates. During each rotation of the shaft the switches are momentarily closed by detents 51, 52 which are mounted on the shaft in the path of the rollers 49, 50. The timing mechanism responds to operation of the microswitches to energize and control the direction of rotation of the motor 35 and shaft 10.

If desired, the timing mechanism 44 may be connected to a door operating mechanism 54 for opening and closing the door 24 at the appropriate time.

In the molding of various objects, difficulties may occur when an object such as a doll indicated by the numeral 70 (FIGS. 12 and 13) is formed. Such doll has a nose 71 and ears 72, 73 projecting at substantially right angles to the plane 74 of the nose. If the mold is mounted to rotate substantially in the plane 75 passing through the ears, then insufficient plastic may be deposited in the nose cavity 71. In order to overcome this the mold is mounted on the base so that the plane which is at right angles to the axis of rotation or plane of rotation 76 is angularly disposed to the plane 75. The optimum angle for uniform distribution may be determined in each case through judgment and trial. For example, for the object 70 the optimum angle alpha is found to be from approximately 22° to 45°, although angles in excess of 45° up to about 68° may be used.

For an object such as the dog 80 having a very long projection such as snout 81, away from the central part, the angle may be zero degrees, although if ears 82 project substantially to the side, then an angle greater than zero degrees may be necessary, the same being determinable by judgment and experimental runs.

If desired or found necessary, shields 88 may be mounted on the mold to decrease the heat received at the various parts which tend to cure more rapidly than the other parts, this being a matter for determination in each case.

In the rotation of the mold plates it is desirable that all of the molds receive substantially identical processing in order to produce uniformity of plastic distribution. Furthermore, the molds must be rotated in such manner that plastic distribution in each is substantially uniform. During the operation within the furnace the liquid plastisol in the molds is distributed on the walls in the mold cavities and gradually gelled and fused. After the mold is removed and cooled the molded object is removed.

In order to properly distribute the plastisol while the mold is in the furnace, the shaft is intermittently rotated and stopped; and then rotated in the same or the reverse direction during exposure to heat treatment within the furnace. As an example of two mold operation (FIG. 6), after the molds are loaded and the furnace door closed, the molds are rotated in one direction for 1½ revolutions, briefly stopped, and then again rotated in the same direction for 1½ revolutions and again briefly stopped. Then the direction of rotation is reversed for 1½ revolutions and briefly stopped, then continued in such reverse direction for 1½ revolutions and then briefly stopped. Then the direction is again reversed and the cycle repeated. It has been found with a pair of mold plates that excellent results are obtained if the molds are rotated at 24½ r.p.m.

The use of 1½ revolutions results in the mold which was first uppermost being first stopped in the lowermost position, and vice versa. Thus, the two molds receive substantially identical rotation and are positioned in the upper and lower stations substantially identically and the centrifugal force operating on each is substantially identical.

In practice it has been found that good results are obtained if driving force is applied to the mold shaft for one revolution and then the shaft coasts to a stop in the remaining half revolution. As soon as a full stop has been reached, motion is again resumed without any substantial rest period.

Although 1½ revolutions has been found to be a convenient and preferred method of operation, other units of revolution such as 2½, 3½, and so forth, up to possibly 6½ or 8½, could be employed. However, it is necessary that periodic reversal of direction be employed in order to obtain uniform distribution within each mold.

If a different number of molds, such as three or four, are mounted equally spaced around the axis of the shaft, then the unit of rotation should be adjusted in order to subject each to substantially identical molding operations. For example, if three molds were used the unit of rotation might be either 1⅓ or 1⅔ of a revolution. On the other hand, if four were used then the unit of rotation might be either 1¾ or 1¼ revolutions.

It should be understood that the speed of rotation is related to the distance that the mold is mounted from the axis, as the forces causing the plastisol to flow into the various portions of the mold cavity are related to the peripheral speed of the mold about the axis. Thus, mounting the mold closer to the axis would normally require more rapid speed than if the mold were spaced further from the axis. The optimum speed of rotation and angular positioning of the mold may vary in accordance with the particular material being molded.

It has been found that objects such as the doll 70 produced in accordance with the present invention have stronger and more uniform thicknesses near reduced extremities such as the joints 84 than objects produced in accordance with previous rotational casting in two or more planes. As a result of insufficient wall thickness at the portions mentioned it has been necessary to use a plastisol of relatively great hardness in order to have adequate stiffness in such regions for the doll to be self-supporting. In such a doll produced in accordance with the present invention, however, the more uniform the increased thickness at such regions permits the use of the softer more desirable material.

Various materials may be molded by the process described including vinyl plastisols whose components are well known. An illustrative vinyl plastisol consists of the following:

| | Lbs. |
|---|---|
| Polyvinyl chloride resin, suspension type | 150 |
| Polyvinyl chloride resin, emulsion type | 160 |
| Phthalate plasticizer | 122 |
| Epoxy plasticizer | 7.5 |
| Filler, calcium carbonate | 25 |
| Dioctyl palmitate | 30 |
| Color pigment, as required. | |

Although the temperature and molding time may vary, it has been found that a furnace temperature of approximately 375° F. is satisfactory for a molding time of approximately seven minutes, the temperature being dependent on the time. For a shorter cycle, e.g., five minutes, the temperature should be approximately 450° F.

Accordingly, it will be evident that the present invention includes the process of molding hollow objects of material such as vinyl plastisols in a rotating mold within a furnace in which the object is positioned for optimum distribution of the material into all of the cavities, and in which the rotation is intermittent and reversed at short intervals after coming to rest.

It will be obvious to those skilled in the art that various changes may be made in the invention without departing from the spirit and scope thereof and therefore the invention is not limited by that which is illustrated

What is claimed is:

1. The process of making a hollow article having a major longitudinal axis and major and minor transverse axes, comprising mounting a mold for said article for rotation about an axis of rotation and with the major longitudinal axis of the mold cavity substantially parallel to a radial line disposed in a plane disposed at right angles to the axis of rotation and with the cavity disposed so that a plane which is at right angles to the axis of rotation passes intermediate the major and minor transverse axes of the mold cavity, depositing a measured liquid charge of plastisol in the mold, closing the mold, and rotating the mold intermittently for brief intervals in one direction and then in the other while subjecting it to heat for a sufficient time to cause the mixture to gel and fuse.

2. The process of claim 1 in which a pair of molds are mounted 180° apart and the molds are rotated a unit number less than 10 and an additional ½ revolutions in one direction and stopped, then rotated a similar number of turns in the same direction and stopped, then reversedly rotated a similar number of turns and then stopped, then rotated a similar number of turns in said reverse direction and stopped, and then rotated again in the initial direction with repetition of the foregoing cycle.

3. The method of making hollow articles from a liquid mixture of a vinyl resin and a plasticizer therefor, comprising the step of depositing a measured charged of such mixture in a hollow mold the inner surface of which is nonporous, the charge being less in volume than the volume of the mold, closing the mold and maintaining it in closed condition, heating the closed mold and at the same time revolving it about a horizontal axis with the mold supported so that a radial line disposed in a plane disposed at right angles to the horizontal axis is between its major and minor transverse axes and its principal longitudinal axis is parallel to said radial line and for a sufficient period to cause the mixture to gel as a layer of substantially uniform thickness over the entire inner surface of the mold, continuing the application of heat to the mold to fuse the gelled layer while the mold is being revolved, said revolving including frequent stopping and reversal of the direction of rotation, then cooling the mold until the temperature of the layer is below its fusing temperature, opening the mold and removing the article therefrom.

4. In the manufacture of hollow articles by rotary molding about an axis of rotation, said articles having a principal longitudinal axis and major and minor transverse axes, the improvement comprising mounting the mold with the longitudinal axis of its cavity substantially parallel to a radial line disposed in a plane disposed at right angles to the axis of rotation and with the mold cavity disposed so that a plane which is at right angles to the axis of rotation passes between said major and minor axes.

5. In an apparatus for effecting rotation of molds for producing hollow articles having major and minor transverse axes, the combination of a rotatable shaft and a mold supporting member secured to said shaft, and one or more molds secured to said mold supporting member, said molds being mounted with the major axes of their cavities substantially parallel to a radial line disposed in a plane disposed at right angles to said shaft, said molds having major and minor transverse axes, said molds being mounted with the cavity disposed so that a plane which is at right angles to the shaft passes intermediate said major and minor transverse axes.

6. Apparatus for molding, comprising a furnace having an enclosure, a shaft rotatably and horizontally mounted and having a portion within said enclosure, a mold support mounted on said shaft portion and having means for mounting a mold thereon, one or more molds mounted on said support, said molds each having a longitudinal axis and major and minor transverse axes, said molds being mounted with their longitudinal axis parallel to a radial line disposed in a plane disposed at right angles to the shaft and with the cavity disposed so that a plane which is at right angles to the axis of rotation passes between their major and minor transverse axes, means for rotating said shaft, and means for automatically stopping and starting said shaft and reversing its direction of rotation, said automatic means comprising a pair of switch arms positioned to engage and ride upon said shaft as it rotates, said switch arms having contacting portions spaced along said shaft, abutment means on said shaft for engaging each of said switch arms as the shaft rotates, and electrical control means connected to said switch arms for stopping the shaft and reversing its direction of rotation.

References Cited in the file of this patent

UNITED STATES PATENTS

| | | |
|---|---|---|
| 1,541,831 | Linder | June 16, 1925 |
| 2,573,693 | De Bell | Nov. 6, 1951 |
| 2,633,605 | Brucker | Apr. 7, 1953 |
| 2,681,472 | Rempel | June 22, 1954 |
| 2,683,286 | Linhart | July 13, 1954 |
| 2,881,476 | Page | Apr. 14, 1959 |
| 2,893,057 | Rekettye | July 7, 1959 |
| 2,914,436 | Nakielny | Nov. 24, 1959 |
| 2,941,912 | Cox et al. | June 21, 1960 |
| 2,957,202 | Rekettye | Oct. 25, 1960 |

FOREIGN PATENTS

| | | |
|---|---|---|
| 580,937 | Canada | Aug. 4, 1959 |